(12) United States Patent
Moran et al.

(10) Patent No.: US 10,019,599 B1
(45) Date of Patent: Jul. 10, 2018

(54) LIMITING APPLICATIONS EXECUTION TIME

(71) Applicant: COMIGO LTD., Yarkona (IL)

(72) Inventors: Dov Moran, Kfar-Saba (IL); Menahem Lasser, Kohav-Yair (IL)

(73) Assignee: COMIGO LTD., Yarkona (IL)

( * ) Notice: Subject to any disclaimer, the term of this patent is extended or adjusted under 35 U.S.C. 154(b) by 244 days.

(21) Appl. No.: 14/958,952

(22) Filed: Dec. 4, 2015

Related U.S. Application Data

(60) Provisional application No. 62/144,533, filed on Apr. 8, 2015.

(51) Int. Cl.
*G06F 21/00* (2013.01)
*G06F 21/62* (2013.01)

(52) U.S. Cl.
CPC .................. *G06F 21/629* (2013.01)

(58) Field of Classification Search
CPC ...................................... G06F 21/629
See application file for complete search history.

(56) References Cited

U.S. PATENT DOCUMENTS

| | | | |
|---|---|---|---|
| 5,550,575 A | 8/1996 | West et al. | |
| 5,949,471 A | 9/1999 | Yuen et al. | |
| 7,149,309 B1 | 12/2006 | Silver | |
| 7,209,957 B2 | 4/2007 | Patron et al. | |
| 8,225,345 B2 | 7/2012 | Sahasrabudhe et al. | |
| 8,718,633 B2 | 5/2014 | Sprigg et al. | |
| 2004/0006690 A1* | 1/2004 | Du ........................ | G06F 9/441 713/2 |
| 2005/0240960 A1 | 10/2005 | Nagtzaam | |
| 2011/0065419 A1* | 3/2011 | Book ..................... | G06F 21/305 455/411 |
| 2013/0254660 A1* | 9/2013 | Fujioka ................... | A63F 13/12 715/707 |
| 2014/0195678 A1* | 7/2014 | Longhorn ............... | H04L 43/50 709/224 |
| 2014/0208397 A1 | 7/2014 | Peterson | |
| 2016/0085385 A1* | 3/2016 | Gao ..................... | G06Q 10/109 715/814 |

OTHER PUBLICATIONS

Amazing Parental Controls for Android and Apple mobile devices material downloaded from http://www.curbi.com/-curbi on Dec 6, 2015.
Screen Time Parental Control material downloaded from https://play.google.com/store/apps/details?id=com.screentime on Oct. 22, 2016.

* cited by examiner

*Primary Examiner* — Kendall Dolly
(74) *Attorney, Agent, or Firm* — Marc Van Dyke; Fourth Dimension IP

(57) ABSTRACT

A method of limiting execution of a software application according to a pre-defined time-based rule comprises: whenever the software application is attempted to be launched, enforcing a pre-defined time-based rule (e.g. that is user-immutable) such that: i. whenever the software application is attempted to be launched during a first time interval, the execution of the software application is enabled; ii. whenever the software application is attempted to be launched during a second time interval immediately following the first time interval, the execution of the software application is limited; and iii. whenever the software application is attempted to be launched during a third time interval immediately following the second time interval, the execution of the software application is enabled.

23 Claims, 7 Drawing Sheets

Partial Limiting Scenario (functionality)

During execution of the software application, attempt S351 to provide 'target' (i.e. potentially disabled) functionality (e.g. user requests this functionality)

Has S355 the potentially-disabled functionality been disabled according to a (e.g. previously-analyzed) time-based condition? (e.g. according to results of reading a flag)

Partial Limiting
X

YES

Enabled
✓

NO

Prevent S363 providing of the target functionality (e.g. terminate or freeze or resume execution without providing target functionality (e.g. return to pre-attempt state))

Permit S367 continued execution of the application to provide target functionality

FIG. 5B

LIMITING APPLICATIONS EXECUTION TIME

CROSS-REFERENCE TO RELATED APPLICATIONS

This patent application claims the benefit of U.S. Provisional Patent Application No. 62/144,533 filed on Apr. 8, 2015, which is incorporated herein by reference in its entirety.

BACKGROUND AND RELATED ART

Mobile software applications are very common today in smartphones and tablets and can be purchased in Internet stores such as Google's Play Store. Another type of software application is an interactive TV application presented to the user on a video screen (which may be a TV, a tablet, a smartphone, a PC, etc.) that is typically related to the content played on the screen at the same time. For example during a TV broadcast of a basketball game a TV may present an icon for an interactive TV application that if selected provides statistics about the players taking part in the game, and an interested viewer may launch it during the game. Such interactive applications are offered for example by Comigo Ltd. under the name "WatchApp™ applications" as supplementary items to its interactive Set-Top Boxes.

Usually software programs are not limited regarding the time of their use. For example, after one buys a word processing program he may use it whenever he likes. But the concept of limiting the use of software according to time is well known in the art—software developers sometimes release demo versions that expire after a pre-defined time interval since their activation. This allows potential buyers to test the program with no commitment but eliminates the risk (to the developer) that the user will keep using the tested item without ever buying it.

Another type of time-limited software is software that is licensed for use on a yearly or monthly basis and expires once the licensing period is over.

FIG. 1 is a block diagram of a prior art of a computing device comprising processor(s) (e.g. microprocessor(s)) 110 and storage 120 within which both data 140 and software is stored. The software may include operating system software 130 and one or more software applications 240A ... 240N. The data 140 may include data employed by the operating system software 130 (e.g. provided as a "configuration file") or user-application data (e.g. an address-book for an email application or one or more "document" files for a word-processing program) accessed by one more software application(s) 240. Examples of operating system software includes but are not limited to Linux, Unix, Windows®, Mac OS® (e.g. OS X®), Android®, and iOS®. Software applications are clearly not the same as operating system software 130 though software applications may invoke operating system functionality (e.g. by calling an API).

For the present disclosure, storage 120 refers to any combination of volatile (e.g. RAM) and/or non-volatile (e.g. magnetic storage or flash memory) memory or storage.

Optionally, computing device 100 may include one or more of (i.e. any combination of) a system clock 150, a display screen 320 (e.g. a touch-screen), a user-input device (e.g. a keyboard, mouse, touch-screen, joystick, etc) and a communications module 290 (e.g. for communicating with other computing devices).

Computing device 100 may have any form factor including but not limited to mobile phone, laptop, and desktop.

SUMMARY OF EMBODIMENTS

Embodiments of the present invention relate to a time-based limiting mechanism (e.g. user-immutable) configured to limit execution of a software application by the processor at specific times according to a pre-defined time-based rule such that (i) whenever the software application is attempted to be launched during a first time interval, the execution of the software application is enabled; (ii) whenever the software application is attempted to be launched during a second time interval immediately following the first time interval, the execution of the software application is limited; and (iii) whenever the software application is attempted to be launched during a third time interval immediately following the second time interval, the execution of the software application is enabled.

As discussed below, the term "limiting" may refer to (i) a partial limiting of execution where certain functionality is disabled or an amount of time that the application is allowed to execute is limited or to (ii) a complete limiting where launch of the application is prevented or where launch is permitted but all useful functionality in the software application is disabled.

In some embodiments, the presently-disclosed time-based limiting mechanism thus may limit the time of using an application in a more controlled way than in the prior art expiration time model.

In one non-limiting example, a developer of an adult entertainment interactive application desires (possibly at the request of a TV operator to which he sells his interactive application) to limit its use to late night hours, for example between midnight and 5 am.

According to a second non-limiting example, a customer help-desk application requires online human response from a support center of a company that is closed on weekends. In this second example, the application developer may be asked to restrict the application to be usable only on working days and not executable on other days of the week.

A computing device comprises: a. a volatile or non-volatile storage; b. a software application residing within the storage; c. a processor to execute the software application; and d. a user-immutable time-based limiting mechanism to limit execution of the software application by the processor at specific times according to a pre-defined time-based rule such that for a first time-interval, a second time-interval immediately following the first time interval, and a third time-interval immediately following the second time interval: i. whenever the software application is attempted to be launched during the first time interval, the execution of the software application is enabled; ii. whenever the software application is attempted to be launched during the second time interval, the execution of the software application is limited; and iii. whenever the software application is attempted to be launched during the third time interval, the execution of the software application is enabled.

In some embodiments, the time-based limiting mechanism enforces the pre-defined time-based rule by preventing launch of the software application during the second time-interval—this is one example of a "complete limiting."

Alternatively, in some embodiments, the time-based limiting mechanism enforces the pre-defined time-based rule by disabling only some functionality of the software application but not other functionality of the software application in response to a user launching of the software application during the second time-interval. Thus, in one non-limiting example, (i) if a word processing application is launched during the first or third periods of time the word processor provides "full functionality" including the ability to "print document" functionality; however, (ii) if the word processing application is launched during the second periods of time, the "print document" functionality is disabled. For example, in response to an attempt to print the document, the word processing application may terminate (instead of printing the document), or may freeze, or in another example, simply resume its "non-print" functionality without printing the document.

In another example of "partial limiting," the time-based limiting mechanism enforces the pre-defined time-based rule by limiting an execution time of the software application in response to a user launching of the software during the second time-interval. For example, the application may be only permitted to execute for a fixed number of seconds, after which the application freezes or is forced to terminate.

In all embodiments, when execution of the application is partially or completely limited, an appropriate error message may be provided in response to an attempt to execute a "completely limited" application or, another example, to invoke disabled functionality of a "partially limited" application.

In some embodiments, the user-immutable time-based limiting mechanism enforces the pre-defined time-base rule according to contents of a configuration file.

In some embodiments, the user-immutable time-based limiting mechanism is hard-coded into the software application.

In some embodiments, the user-immutable time-based limiting mechanism is external to the software application—e.g. residing within a software wrapper that wraps the software application.

Alternatively or additionally, the user-immutable time-based limiting mechanism may be implemented at least in part in hardware (e.g. a dongle).

A method of limiting execution of a software application according to a pre-defined time-based rule comprises: whenever the software application is attempted to be launched, enforcing a pre-defined time-based rule (e.g. that is user-immutable) such that i. whenever the software application is attempted to be launched during a first time interval, the execution of the software application is enabled ii. whenever the software application is attempted to be launched during a second time interval immediately following the first time interval, the execution of the software application is limited; and iii. whenever the software application is attempted to be launched during a third time interval immediately following the second time interval, the execution of the software application is enabled.

In some embodiments, the pre-defined time-based rule is enforced by preventing launch of the software application whenever the software application is attempted to be launched during the second time-interval.

In some embodiments, the pre-defined time-based rule is enforced by disabling only some functionality of the software application but not other functionality of the software application in response to a user launching of the software application during the second time-interval.

In some embodiments, the pre-defined time-based rule is enforced by limiting an execution time of the software application in response to a user launching of the software application during the second time-interval.

In some embodiments, the pre-defined time-based rule is enforced according to contents of a configuration file.

In some embodiments, the pre-defined time-based rule is enforced by executing instructions that are hard-coded into the software application. Alternatively or additionally, the pre-defined time-based rule may be enforced by executing instructions that are external to the software application.

In some embodiments, the executed external instructions reside within a software wrapper that wraps the software application.

In some embodiments, the pre-defined time-based rule is enforced (i) by executing instructions that are encoded in hardware and/or (ii) according to hardware-encoded data that is permanently stored in hardware.

In some embodiments, the pre-defined time-based rule is evaluated after the application is launched and if a result of evaluating the rule indicates the application should be limited, the application is terminated.

In some embodiments, the software application is an interactive TV application.

In some embodiments, the enforced pre-defined time-based rule selectively limits execution of the software application according to a time-of-day in which a user attempts to launch the application.

In some embodiments, the enforced pre-defined time-based rule selectively limits execution of the software application according to a day-of-the-week in which a user attempts to launch the application.

In some embodiments, the enforced pre-defined time-based rule selectively limits execution of the software application according to a day-of-the-month in which a user attempts to launch the application.

In some embodiments, the enforced time-based pre-defined rule selectively limits execution of the software application according to a combination of multiple factors selected from a group consisting of a time of day, a day of the week and a day of the month in which a user attempts to launch the application.

In some embodiments, the enforced time-based pre-defined rule further instructs to limit the application whenever the software application is attempted to be launched during a fourth time interval that is later in time than the third time interval.

In some embodiments, the enforced time-based pre-defined rule further instructs to enable the application whenever the software application is attempted to be launched during a fifth time interval that is later in time than the fourth time interval.

In some embodiments, two successive limited intervals have different lengths.

In some embodiments, the enforced pre-defined time-based rule selectively limits execution of the software application according to a temporally periodic pattern.

In some embodiments, the pre-defined time-based rule is dependent on a value retrieved from a server.

In some embodiments, the value retrieved from the server is a sunset time.

In some embodiments, the value retrieved from the server is a sunrise time.

In some embodiments, the pre-defined time-based rule is dependent on a random or pseudo-random value.

BRIEF DESCRIPTION OF THE DRAWINGS

FIGS. 3-4, 5A-5B and 6 are flow-charts of methods of limiting execution of a software application according to some embodiments.

DETAILED DESCRIPTION OF EMBODIMENTS

The claims below will be better understood by referring to the present detailed description of example embodiments with reference to the figures. The description, embodiments and figures are not to be taken as limiting the scope of the claims. It should be understood that not every feature of the presently disclosed methods, apparatuses, and computer readable media having stored thereon computer code is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to"), rather than the mandatory sense (i.e. meaning "must").

Embodiments of the present invention relate to software applications whose execution is selectively enabled (or limited) in a manner that is sensitive to a time of attempted launch thereof. In particular, due to a presence of a time-limiting mechanism (e.g. user-immutable), execution of the software is partially or completely limited in accordance with a pre-defined time-based rule.

Figure 1:
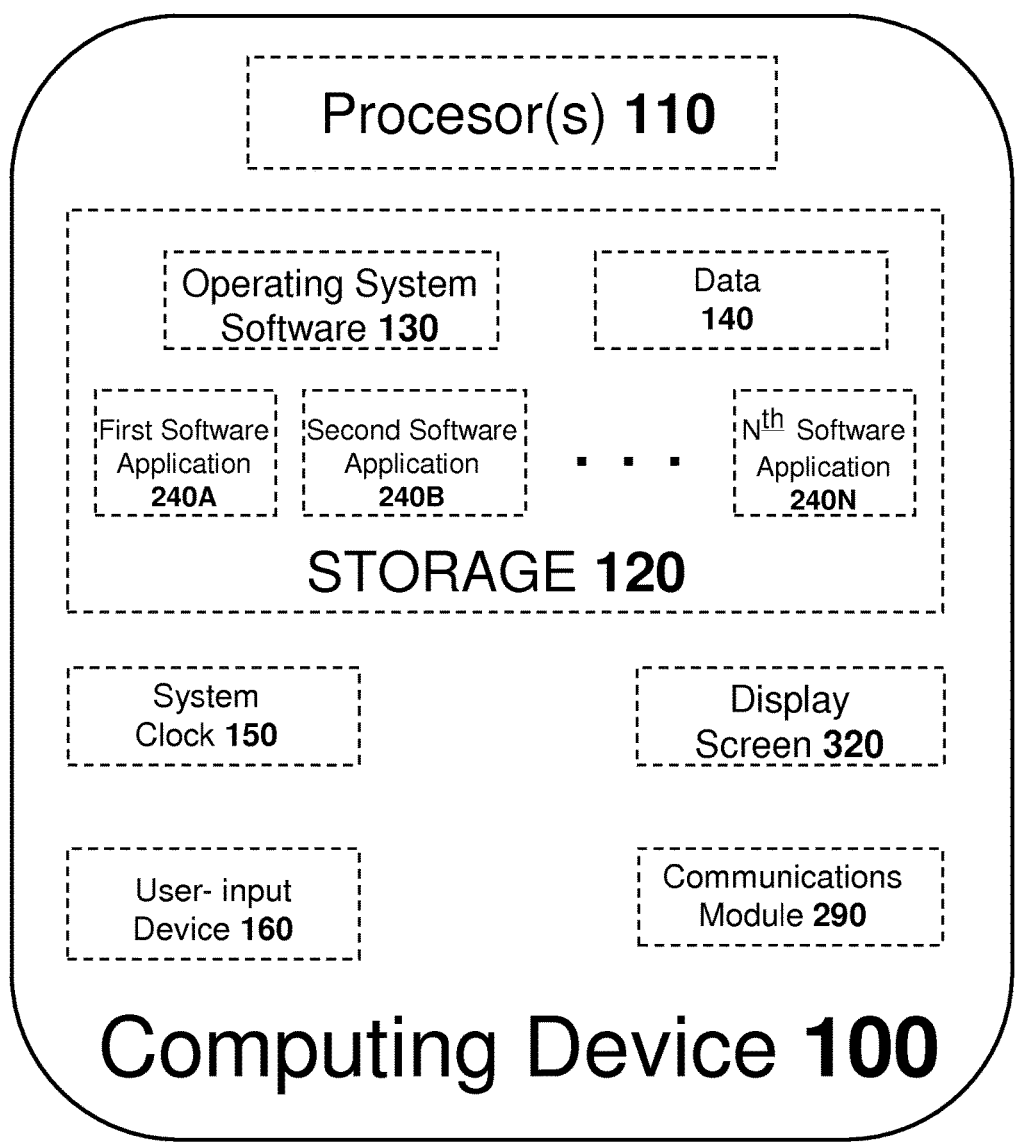
FIG. 1 is a block diagram of a prior art of a computing device.
Figure 2A:
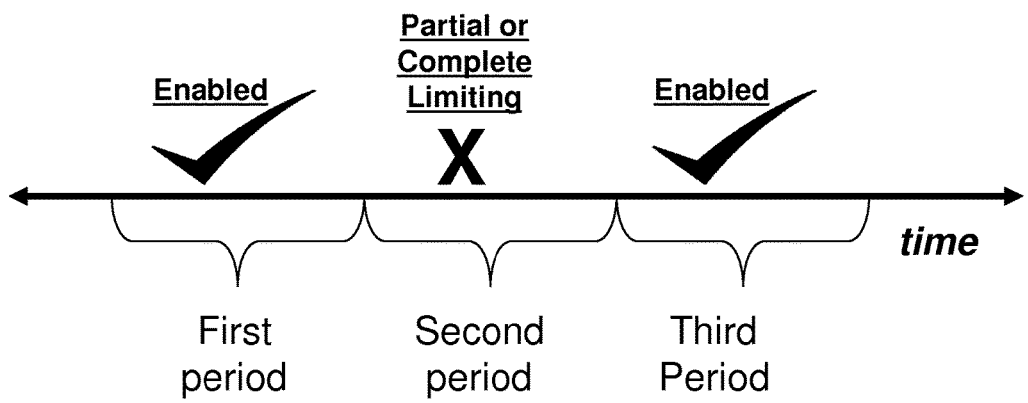
FIGS. 2A-2C are timelines indicating periods of time where execution is enabled or at least partially disabled according to several non-limiting examples.

One non-limiting example is illustrated in FIG. 2A which illustrates a first period of time (e.g. between Jan. 1, 2016 at midnight and Jan. 8, 2016 at midnight), a second period of time immediately following the first period of time (e.g. between Jan. 8, 2016 at midnight and Jan. 15, 2016 at midnight), and a third period of time (e.g. between Jan. 15, 2016 at midnight and Jan. 22, 2016 at midnight). According to this example, if an attempt is made to launch the software application during the first or third periods of time, execution of the software application is enabled—i.e. the time-limiting mechanism does not disable or otherwise limit execution of the software application. In contrast, if this attempt is made during the second period of time, the time-limiting mechanism either disables launch of the application, or limits the functionality of the application, or limits the amount of time the application is allowed to execute.

Unlike the prior art time-limited applications, presently-disclosed embodiments are not about "one-shot" time expiration after which the application is useless forever. Instead it is about having a time interval in which use of the application is not possible, but before and after that interval use is allowed.

Figure 2B:
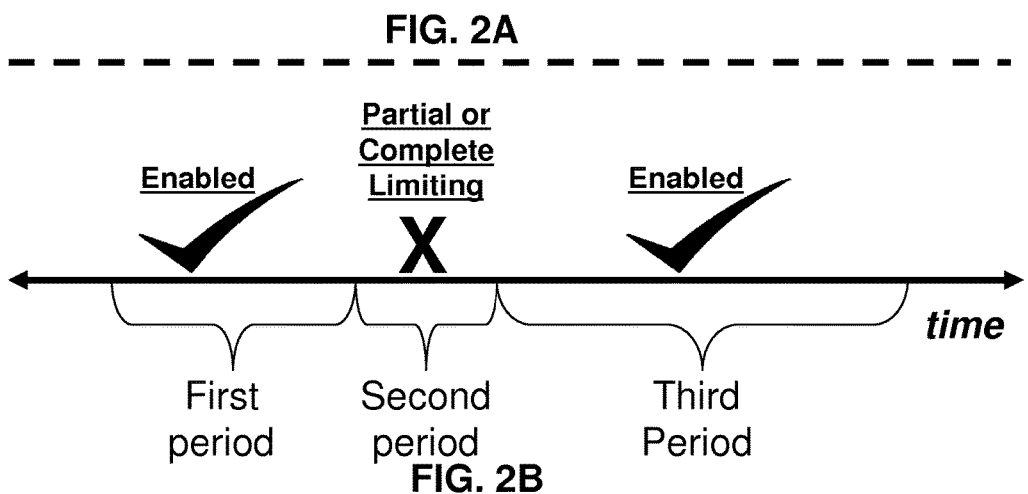
Figure 2C:
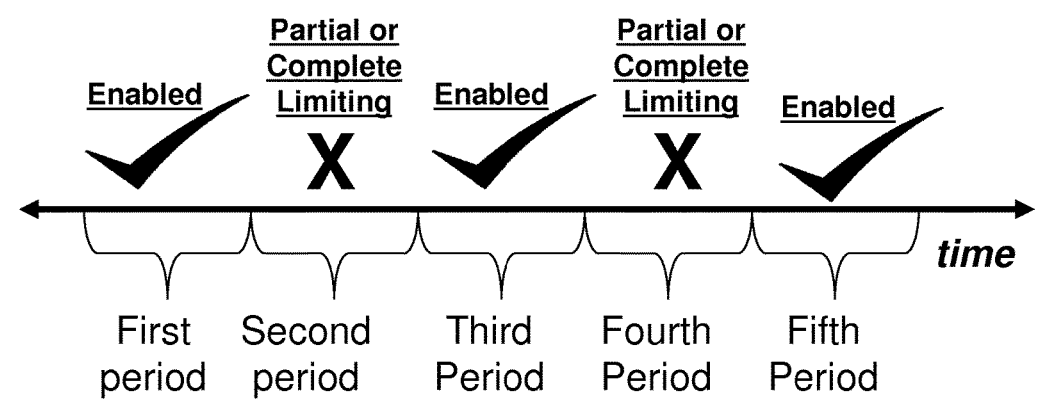

As shown in FIG. 2B and in contrast to the example of FIG. 2A, the durations of the first, second and third periods and not required to be equal. FIG. 2C illustrates yet another example.

In one specific non-limiting example, the "time limitation" is repetitive—that is, with multiple intervals in which use of the application is partially or completely limited. One example is a limitation based on time of day—for example an application may be disabled every day between midnight and 6 am. Another example is a limitation based on days of the week—for example an application may be disabled every weekend on Saturday and Sunday. Still another example is a limitation based on days of the month—for example an application may be disabled every 1st day of a month. Also, the limitation may be based on combinations of the above—for example an application may be disabled on every Friday between 5 pm and 10 pm and on every Saturday between 10 am and 11 pm.

The limitation does not have to be fully repetitive in the sense that it has a fixed time cycle after which it repeats. The partially or completely disabled intervals may not be of equal length and may change based on factors that may be pre-calculated, calculated in real-time according to pre-defined rules or randomly selected. For example an application may be disabled every night based on time of sunset—from three hours after sunset to eight hours after sunset. Or an application may be disabled for two hours every night, with starting time picked randomly within a given time window. In such cases when the application is attempted to be launched it will access an external resource through the Internet (for example a website providing sunset times) or a local resource in the local host (for example a random number generator) in order to decide if it is allowed to execute, and if it determines that it is not allowed it will shut itself down.

It should be emphasized that the rule according to which it is determined whether the application may be launched by a user is pre-defined. By "pre-defined" it is meant that at the time of delivering the application to a user the rule according to which it will be determined when it will be disabled and when it will be enabled is already fully defined and spelt-out. The rule may depend on "external world" factors (such as time of sunrise at the user's current geographic location), but neither the user nor anybody else can influence the rule definition (even though a user can influence the result of evaluating the rule, for example by moving to a different geographic location). Similarly, the rule may depend on random or pseudo-random factors, but nobody can influence the dependency on those factors after application delivery. This "pre-defined" feature of the rule distinguishes this solution from existing parental control or similar application filtering systems that are all restricting time of use of applications according to rules defined after application delivery by a parent, by an employer or by the user himself.

In one specific use-case, a vendor may use the time-restriction mechanism of his application for differentiating multiple versions of the application and possibly charging different prices for them. For example, a vendor may charge a high price for an application that is not restricted in time and a lower price for an equivalent application that may be used only during office hours. Or a vendor may charge a low price for an application that may be used only during office hours and a higher price for an equivalent application that may also be used after office hours but no later than midnight.

DEFINITIONS

Within this application the following terms should be understood to have the following meaning:

(a) software application—an application residing ABOVE the operating system—i.e. executing in user-mode rather than a kernel-mode. A software application by definition has a launch and is distinguished from a snippet of code within an existing host application, or an execution thread or a background service.

(b) a time-based :limiting mechanism—a mechanism that partially or completely limits execution of a software application in accordance with a time-based condition. (i.e. the execution is partly or completely limited whenever the time-based condition is satisfied).

The term time-based condition refers to the fact that the limiting or non-limiting of the limiting mechanism depends upon a time that an attempt is made to launch the software application.

(c) a time-based rule—a rule associated with a software application (i.e. with limiting execution of the software application) whose result (i.e. whether or not the execution of the software application is limited) depends upon a time that an attempt (i.e. successful or not) is made to launch the software application, or equivalently, whose result depends upon a time-based condition.

(d) limiting execution—this can refer to a complete limiting (i.e. disabling of launching) or a partial limiting of execution of the software application. By definition, reducing a quality of execution (e.g. limiting execution speed or display resolution) is not limiting execution—limiting execution is restricted to the specific cases of complete limiting, or partial limiting as defined below in (d) and (e). Optionally, it is possible to also limit quality of execution but this is in addition to the claimed invention (and may optionally be combined therewith) and is not what the present inventors are claiming as limiting execution and is excluded from the definition of limiting execution.

(e) A complete limiting means one of (i) launch of the software application is prevented or (ii) launch of the software application is permitted but all useful functionality of the software application is disabled. The skilled artisan will appreciate that useful functionality does not include displaying error message(s) (i.e. whether related to limitation of execution or not), displaying vendor logo(s) or the like.

(f) A partial limiting refers to at least one of (i) functional degrading and (ii) limiting an amount of time that execution of the application is permitted.

(g) multi-functional software application—a software applications that provides multiple functions—e.g. a calculator software application may provide both basic arithmetic functionality (addition, subtraction, multiplication, and division) along with scientific functionality (logarithms, trigonometric functions, etc)

(h) functional degrading—launch of the application is not disabled, but some functionality of the application is selectively disabled. In one example related to the above scientific calculator software application, basic arithmetic functionality is available but scientific functionality is not available.

This may be enforced as follows: (i) during a time-period of functional degrading, when an attempt to access the degraded functionality is made this attempt fails (i.e. as a result of enforcing the time-based rule) but execution of the application is permitted to continue or (ii) during the time-period of functional degrading, when an attempt to access the degraded functionality is made this attempt fails (i.e. as a result of enforcing the time-based rule;) and in response to this attempt to use the degraded functionality, the application is forced to terminate or exit, ceasing execution of the application. Optionally an error message may be displayed.

(i) limiting an amount of time that execution of the application is permitted—this may be enforced as follows: during the time-period where execution of the application is limited due to enforcement of the time-based rule, the amount of time of execution of the application (that is—the time since its launch) is measured and/or monitored. In response to a determination that the amount of time exceeds some threshold, execution is no longer permitted. For example, the application may be terminated or frozen.

(j) enabling execution—equivalent to not limiting execution.

(k) user-immutable time-based limiting mechanism—a time-based limiting mechanism for which the user cannot disable or change the limiting mechanism of the software application. In some embodiments, the download or presentation of a license key (e.g. digitally signed) disables or changes the user immutable execution-limiting mechanism. As long as the user is not allowed to disable or change the user immutable execution-limiting mechanism without the license-key (e.g. digitally signed), such an execution-limiting mechanism is still considered to be user immutable. In one non-limiting use-case, a user may purchase for a low price the right to execute the application only during business hours, and after paying for an upgrade and downloading updated license credentials, the application is available for execution 24 hours a day, 7 days a weeks. In such case the time-based limiting mechanism of the application is considered user-immutable prior to downloading the updated license credentials. When a time-based limiting mechanism is (i) user-immutable and (ii) limits execution of a software application, we also say that the user-immutable time-based limiting mechanism is user-immutably associated with the software application.

(l) user-immutable time-based rule—a time-based rule for which the user cannot disable or change the application of the rule. This means both that (i) the time-based condition of the rule cannot be disabled or changed by the user and (ii) the association of the software application with the rule (i.e. to limit execution of the software application) cannot be disabled or changed by the user. Therefore a user-immutable time-based rule is necessarily user-immutably associated with the software application. Similar to the case of a user-immutable limiting mechanism, as long as the user is not allowed to disable or change the user-immutable rule (or its association with the software application) without a license-key (e.g. digitally signed), such time-based rule is still considered to be user-immutable.

Discussion of FIGS. 3-6

Figure 3:
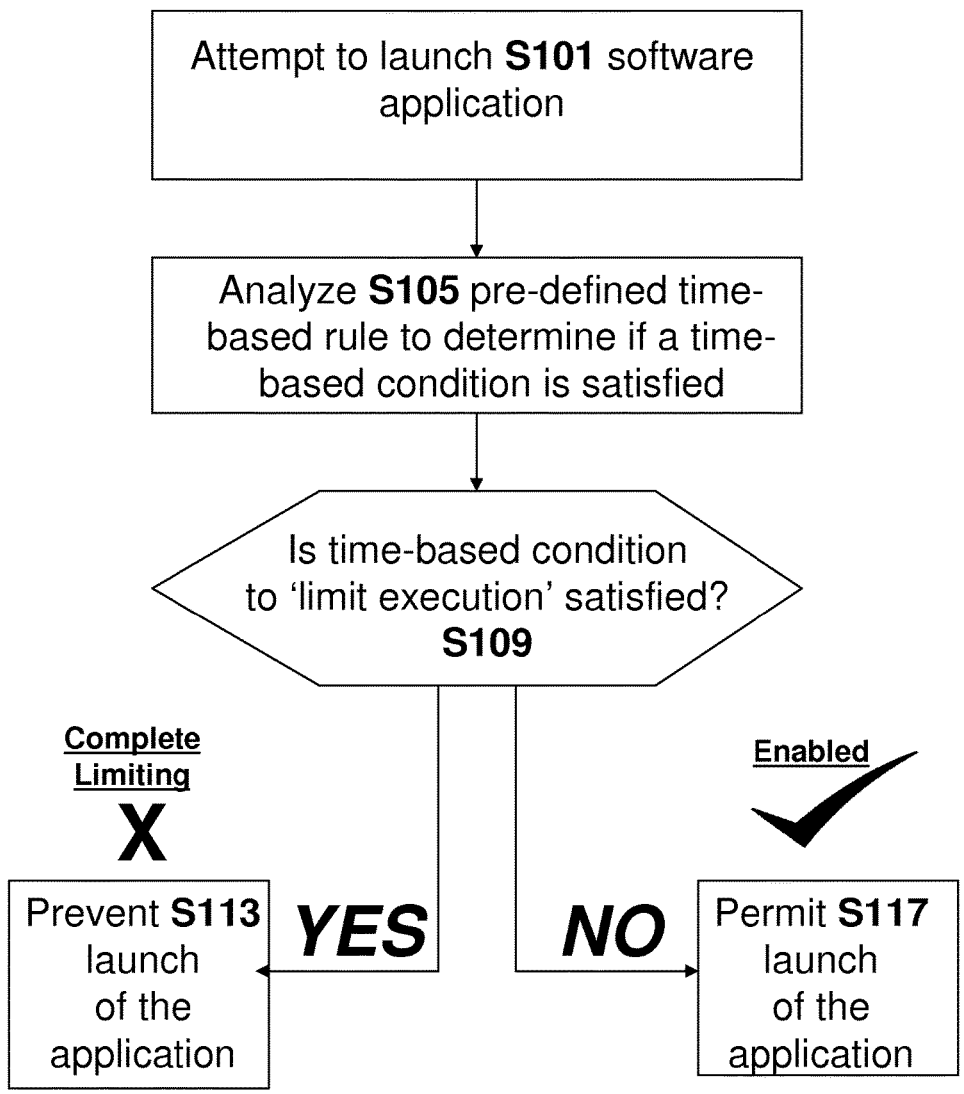

FIG. 3 is a flow-chart of one embodiment of the invention In step S101 an attempt is made to launch the target software application—e.g. the user may explicitly attempt to directly launch the target application (for example, using input device 160) or the user may indirectly attempt to launch the target application by launching another application that in turn attempts to launch the target application. In step S105, the pre-defined rule is analyzed (e.g. in response to the attempt of step S101) to determine if a time-based condition (i.e. related to the time of attempted launch) is satisfied. For example, if the time of attempted launch is within the second time period of FIG. 2A, the condition may thus be satisfied.

As shown in step S109, the program responds to the results of the determining. In response to a determining that the time-based condition is, in fact satisfied ('YES' branch) the launch of the application is prevented in step S113. Otherwise ('NO' branch) the launch of the application is permitted in step S117.

Figure 4:
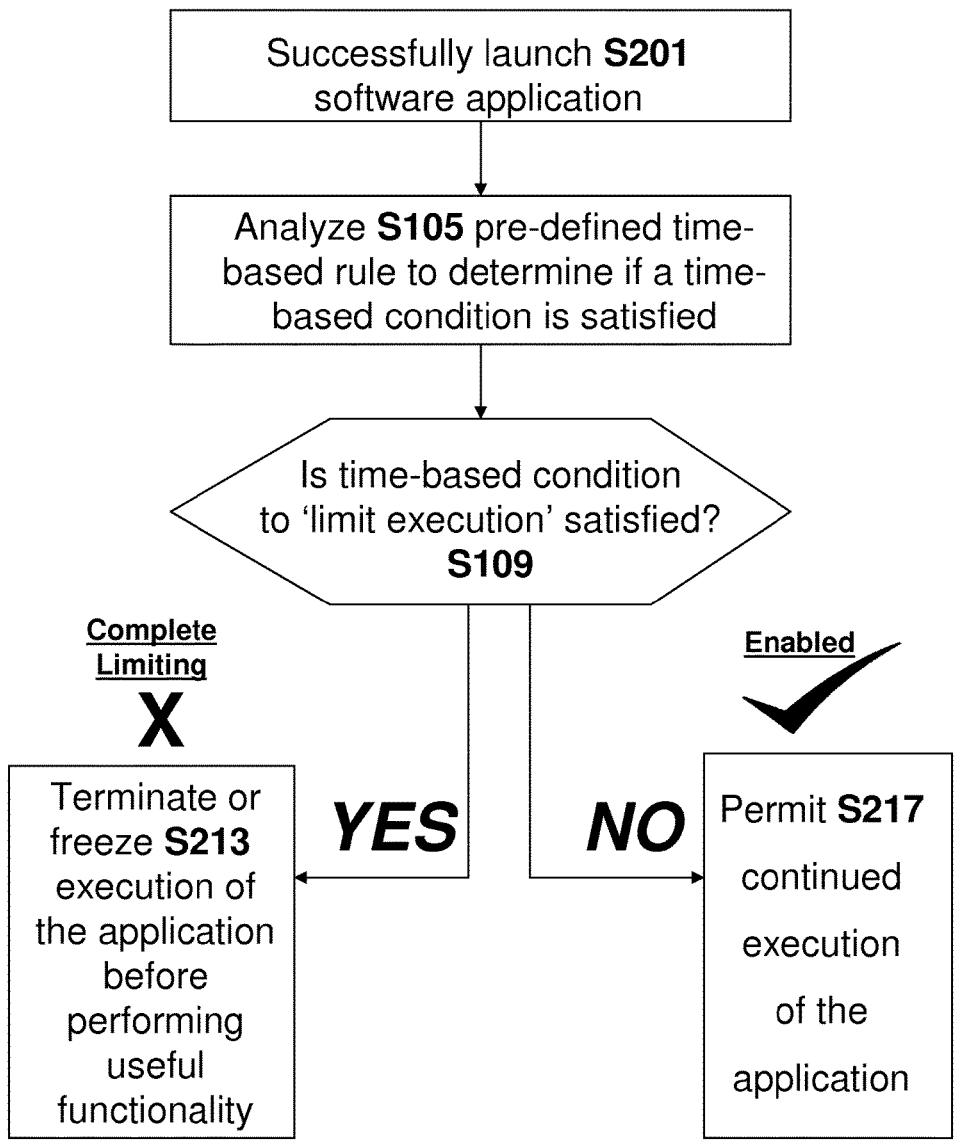

FIG. 4 is a flow-chart of another embodiment of the invention In step S201 an attempt is made to launch the target software application and this attempt succeeds. In step S105, the pre-defined rule is analyzed (e.g. in response to the attempt of step S201) to determine if a time-based condition (i.e. related to the time of launch) is satisfied. For example, if the time of attempted launch is within the second time period of FIG. 2A, the condition may thus be satisfied.

As shown in step S109, the program responds to the results of the determining. In response to a determining that the time-based condition is, in fact satisfied ('YES' branch) the application is not permitted to execute useful functionality step S213—e.g. the application may be forced to terminate or freeze before performing useful functionality. Otherwise ('NO' branch) the continued execution of the application (i.e. to perform useful functionality) is permitted in step S217.

Figure 5A:
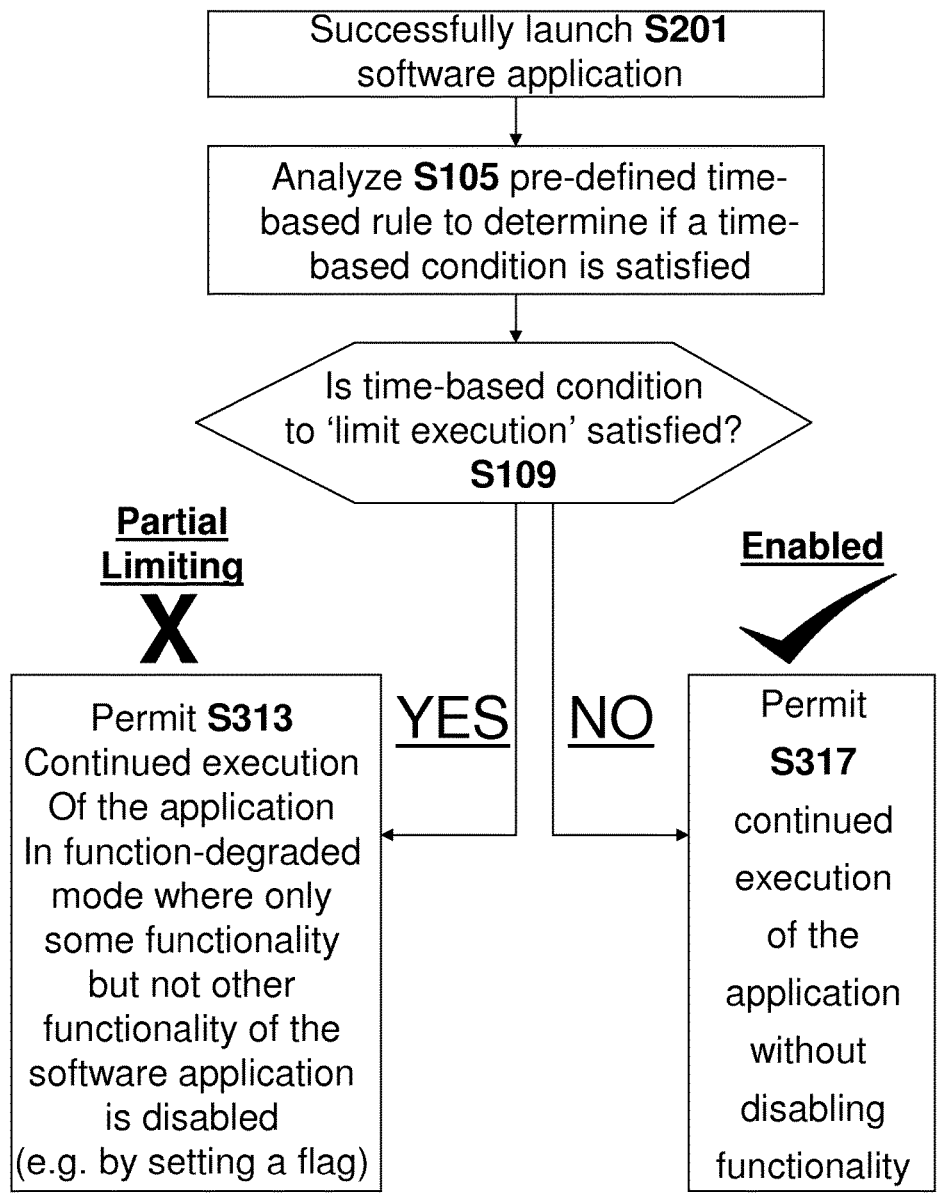
Figure 6:
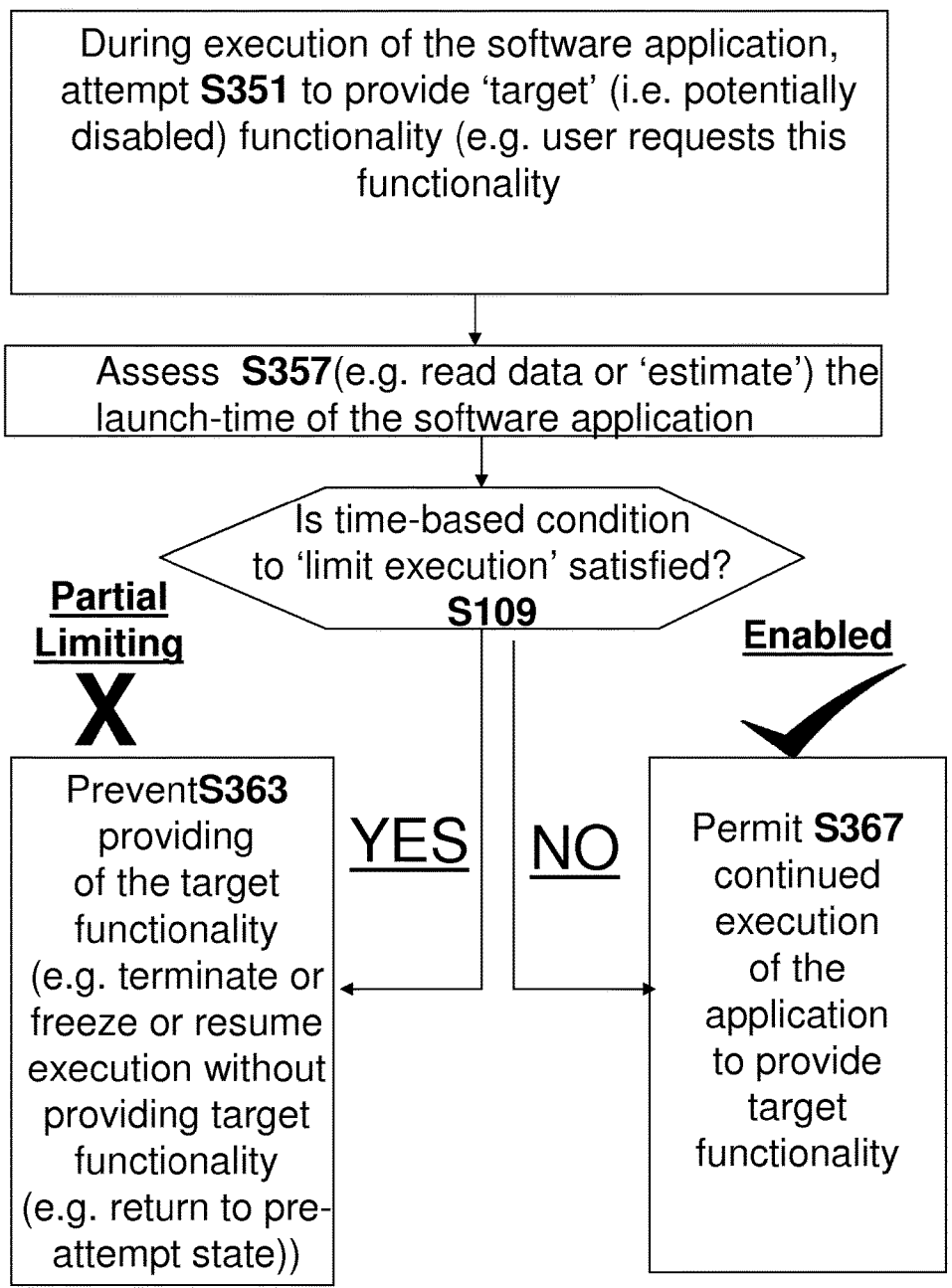

FIGS. 3-4 relate to complete limiting. In contrast, FIGS. 5A-5B and 6 relate to partial limiting. FIG. 5A-5B relate to a first specific non-limiting implementation of a partial limiting where the pre-defined time-based rule is enforced by disabling only some functionality of the software application but not other functionality of the software application in response to a user launching of the software application during the second time-interval; FIG. 6 relates to a second non-limiting implementation.

In the example of FIG. 5A, steps S201, S105 and S109 are as in the example of FIG. 4. However, in response to a 'YES' branch from step S109, continued execution of the application is permitted in step S313 in function-degraded mode where only some functionality but not other functionality of the software application is disabled. This may be enforced, for example, by setting a flag that indicates that the application is currently executing in a functionally-degraded mode and is checked by modules of the application that are subject to disabling when in such mode.

At a later time (see FIG. 5B), when an attempt is made (step S351) to request the selectively-disabled target functionality, an assessment is made (step S355) if this selectively-disabled target functionality has been disabled (e.g. by setting the flag). If yes (step S363), the target functionality is disabled—e.g. by just not providing it, or by terminating or freezing the program). If not (step S367)—i.e. if this functionality has, in fact, not been disabled, it is provided in step S367.

For the sake of completeness, it is noted that the 'no' branch of step S109 of FIG. 5A leads to step S317 where the functionality is permitted.

In the example of FIG. 5A-5B the time-based condition is analyzed in response to the launching of the application in step S201. This is not a requirement, however.

Alternatively, in the non-limiting example of FIG. 6, the time-based condition (i.e. related to the time of launch of the software application) may be analyzed in another context and not necessarily in response to the launching of the application in step S201. FIG. 6 will be explained in terms of the non-limiting example of a word-processor which, if launched during the second time period, behaves so that the print document functionality is selectively disabled.

Thus, in step S351, an attempt is made to request the selectively-disabled functionality—e.g. the user attempts to print the document. In step S357, a launch-time of the application is assessed (e.g. this information may be saved in volatile or non-volatile storage 120 and then read-back in step S357). According to the assessed time of launch, the time-based condition to limit execution (i.e. partially limited—e.g. to disable the print document functionality) is analyzed. If the time-based condition is satisfied (e.g. the word processor, was, in fact, launched during the second time period), then in step S363 the target functionality (e.g. print document from the word processor) is disabled (YES branch from step S109). Otherwise (NO branch from step S109) the functionality is provided in step S367.

As noted above, a partial limiting refers to at least one of (i) functional degrading (illustrated in FIGS. 5A-5B and 6) and (ii) limiting an amount of time that execution of the application is permitted (NOT SHOWN in figures).

In one example related to limiting an amount of time that execution of the application is permitted, if the application is launched during the second time period, after a specific (e.g. pre-determined) period of time (e.g. x seconds where x is a positive number (for example, 30 seconds)) following the successful launch, the application may be made to freeze or terminate.

Additional Discussion

In some embodiments, the time-based limiting mechanism may be programmed to evaluate the rule after the application is launched by a user (e.g. in response to the launching of the application). In some embodiments, the time limiting mechanism terminates the application if the result of evaluating the rule indicates the application should be disabled (e.g. completely disabled, or in another example, partially disabled to limiting execution to x seconds and to terminate after the x seconds of execution have elapsed).

The software application may be an interactive TV application.

The pre-defined time-based rule may instruct to limit the application according to the time of day when a user attempts to launch the application. That is, the rule may say "limit the application between 7 pm and 10:30 pm".

The pre-defined time-based rule may instruct to limit the application according to the day of the week when a user attempts to launch the application. That is, the rule may say "limit the application on Fridays".

The pre-defined time-based rule may instruct to limit the application according to the day of the month when a user attempts to launch the application. That is, the rule may say "limit the application on the $1^{st}$ of each month".

The pre-defined time-based rule may instruct to limit the application according to a combination of multiple factors selected from the group of the time of day, the day of the week and the day of the month when a user attempts to launch the application. That is, the rule may say "limit the application between 1 am and 4 am on Fridays and between 2 am and 8 am on Saturdays".

The pre-defined time-based rule may further instruct to limit the application during a fourth time interval that is later in time than the third time interval, and the rule may further instruct to enable the application during a fifth time interval that is later in time than the fourth time interval. That is, the rule may instruct to have multiple limited intervals separated by multiple enabled intervals, as is the case in the above example of "limit the application on Fridays".

The pre-defined time-based rule may instruct to limit the application according to a repetitive pattern. That is, the rule may be applicable indefinitely with no limited interval being the last such interval, as is the case in the above example of "limit the application on the $1^{st}$ of each month".

Two successive limited intervals may have different length. That is, the rule does not have to generate limited intervals of equal length, as is the case in the above example of "limit the application between 1 am and 4 am on Fridays and between 2 am and 8 am on Saturdays".

The time-based limiting mechanism may retrieve a value from a server (typically by accessing the Internet) when evaluating the rule and may use that value for determining the result of applying the rule.

Examples for the value retrieved from the server to be used in evaluating the rule are sunset time or sunrise time. For example, the rule may say "limit the application between 5 hours after sunset and one hour before sunrise, according to the sunset and sunrise times at the location of the user". The time-based limiting mechanism may then retrieve the sunset and sunrise times from a server, providing as inputs to the server the geographical location of the user and the current date.

The time limiting mechanism may retrieve a random or a pseudo-random value (typically by accessing the local operating system) when evaluating the rule and may use that value for determining the result of applying the rule. For example, the rule may say "limit the application every night starting at midnight, for a time interval of random length selected uniformly between three and four hours".

Additional Discussion

Some embodiments relate to preparing a software application for delivery. The method comprises the following steps: (a) coding the logical structure of the software application and (b) incorporating a user-immutable time-based limiting mechanism into the application that limits use of the application according to a pre-defined rule (as this term is previously defined in this application) that is based on time, where the rule instructs to limit the application during a first time interval, to enable the application during a second time interval that immediately precedes the first time interval, and to enable the application during a third time interval that immediately succeeds the first time interval.

In some embodiments, a second version of the software application is provided in which the user-immutable time-based limiting mechanism limits use of the application according to a second pre-defined rule that is based on time and that is different from the pre-defined rule and offering the software application and the second version of the software application as two different products. That is, a vendor of software applications may offer in the market two versions of an application, both time-restricted, but having different restrictions. The vendor may then charge different prices for the two versions of the application, the tighter the restriction the lower the price.

Alternatively, a second version of the software application is provided in which the user-immutable time-based limiting mechanism is disabled and offering the software application and the second version of the software application as two different products.

That is, a vendor of software applications may offer in the market two versions of an application, one time-restricted and one not. The vendor may then charge different prices for the two versions of the application, with the restricted one having the lower price.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A non-transitory computer-readable storage medium storing program instructions for governing the launch of a software application installed on a computing device, wherein the governing is performed according to a user-immutable time-based rule defining first, second and third consecutive time intervals, the second time interval immediately following the first time interval and the third time interval immediately following the second time interval, wherein the program instructions, when executed by one or more processors of the computing device, cause the computing device to carry out the following:
 a. receiving the user-immutable time-based rule from the non-transitory computer-readable storage medium;
 b. enabling the launch of the software application with full functionality in response to a user attempt to launch the software application in the computing device during the first time interval;
 c. at least one of preventing the launch of the software application and enabling the launch of the software application with partially limited functionality in response to a user attempt to launch the software application in the computing device during the second time interval; and
 d. enabling the launch of the software application with full functionality in response to a user attempt to launch the software application in the computing device during the third time interval,
 wherein the user-immutable time-based rule, according to which the launch of the software application is enabled with full functionality, prevented or enabled with partially limited functionality, is:
  i. a rule for the software application that at the time of delivering the application to the user is already pre-defined by a vendor of the software application,
  ii. not changeable or cancellable by any non-vendor user of the software application, and
  iii. at least one of (A) hard-coded into the software application by the vendor of the software application and (B) implemented, at least in part, according to contents of a configuration file.

2. The non-transitory computer-readable storage medium of claim 1, wherein:
 i. the at least one of preventing the launch of the software application and enabling the launch of the software application with partially limited functionality consists of preventing the launch of the software application in response to a user attempt to launch the software application in the computing device during the second time interval, and
 ii. according to the user-immutable time-based rule, the launch of the software application is either enabled with full functionality or prevented.

3. The non-transitory computer-readable storage medium of claim 1, wherein the user-immutable time-based rule is hard-coded into the software application.

4. The non-transitory computer-readable storage medium of claim 1, wherein at least a portion of the user-immutable time-based rule is implemented according to contents of the configuration file.

5. The non-transitory computer-readable storage medium of claim 1, wherein at least a portion of the user-immutable time-based rule is hardware-implemented in a dongle.

6. A method of governing the launch of a software application installed on a computing device, wherein the method is performed according to a user-immutable time-based rule defining first, second and third consecutive time intervals, the second time interval immediately following the first time interval and the third time interval immediately following the second time interval, the method comprising:
 a. receiving the user-immutable time-based rule from a non-transitory computer-readable medium;

b. in response to a user attempt to launch the software application in the computing device during the first time interval, enabling the launch of the software application with full functionality;

c. in response to a user attempt to launch the software application in the computing device during the second time interval, doing at least one of preventing the launch of the software application and enabling the launch of the software application with partially limited functionality; and d. in response to a user attempt to launch the software application in the computing device during the third time interval, enabling the launch of the software application with full functionality, wherein the user-immutable time-based rule, according to which the launch of the software application is enabled with full functionality, prevented, or enabled with partially limited functionality, is:

i. a rule for the software application that at the time of delivering the application to the user is already pre-defined by a vendor of the software application., ii. not changeable or cancellable by any non-vendor user of the software application, and iii. at least one of (A) hard-coded into the software application by the vendor of the software application and (B) implemented, at least in part, according to contents of a configuration file.

7. The method of claim 6, wherein the user-immutable time-based rule is hard-coded into the software application.

8. The method of claim 6, wherein at least a portion of the user-immutable time-based rule is implemented according to contents of the configuration file.

9. The method of claim 6, wherein at least a portion of the user-immutable time-based rule is hardware-implemented in a dongle.

10. The method of claim 6, wherein, in response to a user attempt to launch the software application in the computing device during the second time interval, preventing the launch of the software application.

11. The method of claim 6, wherein, in response to a user attempt to launch the software application in the computing device during the second time interval, enabling the launch of the software application with partially limited functionality.

12. The method of claim 6, wherein enabling the launch of the software application with partially limited functionality includes limiting an execution time of the software application.

13. The method of claim 6, wherein the preventing the launch of the software application includes executing code of the software application that evaluates the user-immutable time-based rule, and if a result of evaluating the rule indicates that the launch of the software application should be prevented, terminating the software application.

14. The method of claim 6, wherein the first, second and third time intervals are defined based on time-of-day.

15. The method of claim 6, wherein the first, second and third time intervals are defined based on day-of-the-week.

16. The method of claim 6, wherein the time-based rule is additionally defining fourth and fifth consecutive time intervals, the fourth time interval being later in time than the third time interval and the fifth time interval being later in time than the fourth time interval, the method additionally comprising the steps of:

a. in response to a user attempt to launch the software application in the computing device during the fourth time interval, doing at least one of preventing the launch of the software application and enabling the launch of the software application with partially limited functionality; and b. in response to a user attempt to launch the software application in the computing device during the fifth time interval, enabling the launch of the software application with full functionality.

17. The method of claim 16 wherein the second and fourth time intervals have different lengths.

18. The method of claim 6, wherein in accordance with the time-based rule, the doing at least one of preventing the launch of the software application and enabling the launch of the software application with partially limited functionality, is selectively applied according to a temporally periodic pattern.

19. The method of claim 6, wherein the user-immutable time-based rule is dependent on a value retrieved from a server.

20. The method of claim 19, wherein the value retrieved from the server is a sunset time.

21. The method of claim 19 wherein the value retrieved from the server is a sunrise time.

22. The method of claim 6 wherein the user-immutable time-based rule is dependent on a random or pseudo-random value.

23. A non-transitory computer-readable storage medium storing program instructions for governing the launch of a software application installed on a computing device, wherein the governing is performed according to a user-immutable time-based rule defining first, second and third consecutive time intervals, the second time interval immediately following the first time interval and the third time interval immediately following the second time interval, wherein the program instructions, when executed by one or more processors of the computing device, cause the computing device to carry out the following:

a. receiving the user-immutable time-based rule from the non-transitory computer-readable storage medium;

b. enabling the launch of the software application with full functionality in response to a user attempt to launch the software application in the computing device during the first time interval;

c. enabling the launch of the software application with partially limited functionality in response to a user attempt to launch the software application in the computing device during the second time interval; and d. enabling the launch of the software application with full functionality in response to a user attempt to launch the software application in the computing device during the third time interval, wherein the user-immutable time-based rule, according to which the launch of the software application is enabled with full functionality or enabled with partially limited functionality, is:

i. a rule for the software application that at the time of delivering the application to the user is already pre-defined by a vendor of the software application, and ii. not changeable or cancellable by any non-vendor user of the software application.

* * * * *